United States Patent

[11] 3,570,782

[72] Inventor Derek Hayes
        Birminghan, England
[21] Appl. No. 790,999
[22] Filed Jan. 14, 1969
[45] Patented Mar. 16, 1971
[73] Assignee Rabone Chesterman Limited
        Birmingham, England
[32] Priority Jan. 16, 1968
[33] Great Britain
[31] 2261/68

[54] TAPE MEASURES
8 Claims, 4 Drawing Figs.

[52] U.S. Cl. .................................................. 242/107.2
[51] Int. Cl. ............................................................ B65h 75/48
[50] Field of Search ............................................. 242/84.8,
        107, 107.2, 107.3, 107.6; 33/138

[56] References Cited
UNITED STATES PATENTS
2,536,766  1/1951  Pechstein .................... 242/84.8X

| | | | |
|---|---|---|---|
| 2,055,281 | 9/1936 | Dulczewski .................. | 33/138 |
| 3,042,338 | 7/1962 | Ljungberg ..................... | 242/107.2 |
| 3,214,836 | 11/1965 | West ............................ | 242/107.3X |
| 3,435,529 | 4/1969 | Quenot ......................... | 242/107.2X |

FOREIGN PATENTS
859,955  10/1952  Germany ....................... 33/138

OTHER REFERENCES
DAS/145803; publ. 3, 1963; Beck et al., Germany classif. 242/107.2

*Primary Examiner*—Stanley N. Gilreath
*Assistant Examiner*—Werner H. Schroeder
*Attorney*—Norris & Bateman ABSTRACT: A tape measure having a measuring tape coiled within a housing provided with a braking device, the latter including a button accessible externally of the housing to actuate a tape clamping member through an intermediate catch member so that the latter alternately engages and disengages a catch point in the housing to define a tape-clamping and a tape-released position respectively of the member.

PATENTED MAR 16 1971 3,570,782

INVENTOR

DEREK HAYES

By Norris & Bateman

TAPE MEASURES

This invention relates to tape measures of the kind having a measuring tape coiled within a housing so as to be progressively withdrawable through an opening in the housing.

Tape measures of this kind are often provided with a brake serving to hold the tape relative to the housing at any desired extension of the tape from the housing. Such brakes are usually actuated and released by a member mounted on the housing and applying wedging action on the tape. The present invention has for an object to provide a tape measure of the above kind having a brake which can be very readily applied and is particularly effective and robust.

In accordance with this invention, a tape measure comprises a housing, a measuring tape normally coiled within the housing so as to be progressively withdrawable through an opening defined by the housing, a brake operating element presented at the housing exterior, a catch member within the housing and movable by actuation of the operating element alternatively to engage and disengage a catch point in the housing, and a brake member resiliently connected between the catch member and the tape so as to clamp the tape with the catch member and the catch point interengaged.

The invention is more particularly described with reference to the accompanying drawings, wherein.

Figure 1:
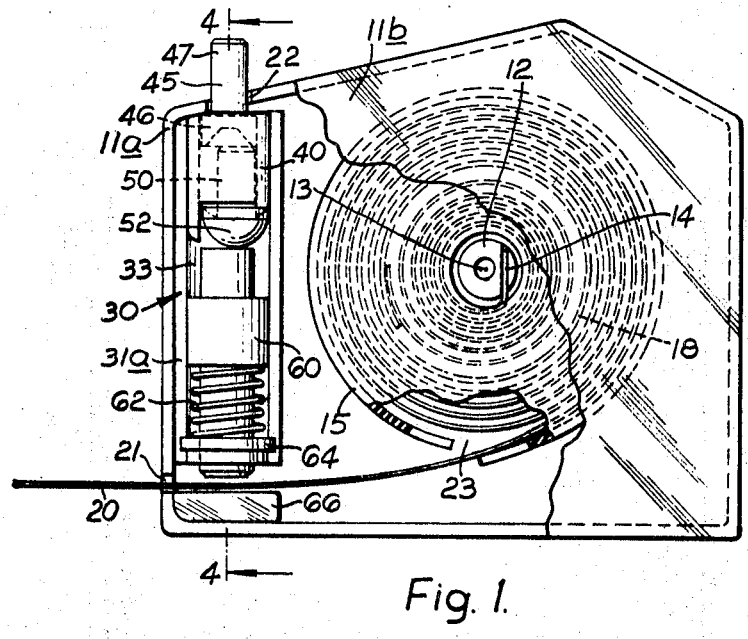
FIG. 1 is a plan view of a tape measure according to the invention, with the housing partly broken away to reveal the interior.

Referring to the drawings, the tape measure comprises a housing 11 made in two complementary shallow-sided dish-shaped parts. One of the parts 11a has a cylindrical spigot 12 provided with a screw-threaded aperture 13 for receiving a bolt (not shown) serving to connect together the two parts of the housing in a conventional manner with the shallow sides of the parts in edge-to-edge contact. The spigot has a chordal slot 14 extending almost throughout its length. A tape opening 21 is formed in a side of the housing extending almost through the entire depth of the housing and a circular aperture 22 is formed in a side of the housing almost perpendicular to the side provided with the tape opening 21. A tape drum 15 is mounted on the spindle so as to permit angular movement of the drum and a spiral spring 18 is mounted in the drum 15 about the spigot 12 with one end engaged in the slot 14. The opposite end of the spiral spring 18 is attached to one end of a measuring tape 20 coiled around the spring within the drum, and the opposite end of the tape projects through an aperture 23 in the drum and through the tape opening 21 to the exterior of the housing 11.

Figure 4:
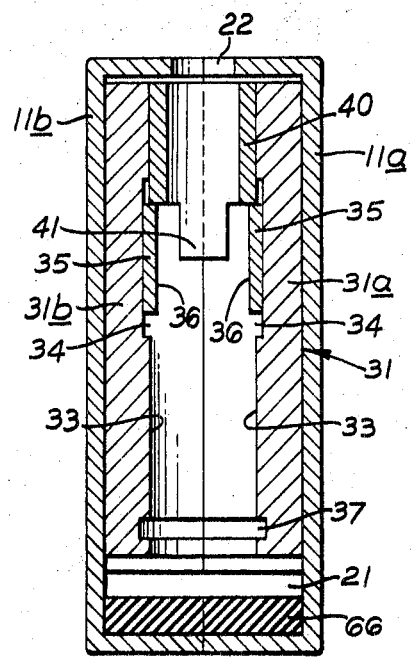
FIG. 4 is a sectional view of the tape measure on line 4—4 of FIG. 1 with some parts omitted.

A braking device 30 is incorporated in the housing 11 and includes a body 31 made in two halves 31a, 31b (FIG. 4) which fit together when the two housing parts are interconnected. Each half has a rectangular section with a semicylindrical channel 33 throughout its length, the two channels together defining a guide passage with the housing parts assembled. Towards one end of each channel there is provided a recess 34 in which is fixed a bar 35 having a guide surface 36 projecting beyond the semicylindrical surface of the channel. The guide surfaces 36 of the two bars are in spaced, parallel alignment, with the housing parts assembled, as shown in FIG. 4. An annular groove 37 is defined in the inner periphery of the body 31 at the end of the body more remote from the recesses 34.

The body is mounted in the housing along one sidewall with the guide passage, defined by channels 33, approximately axially aligned with the aperture 22 in the housing and the body extending between and in proximity to the aperture 22 and the slot 21.

Figure 2:
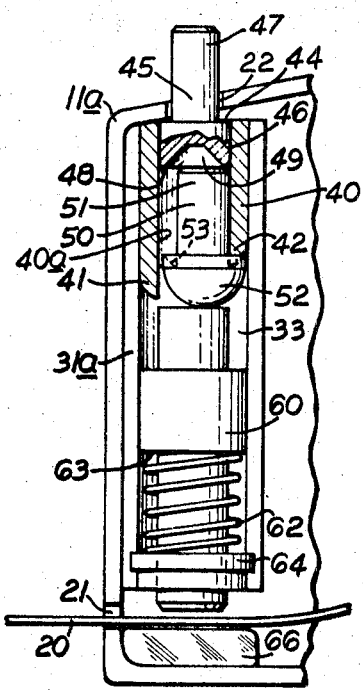
FIG. 2 is an enlarged view of a part of the tape measure of FIG. 1.
Figure 3:
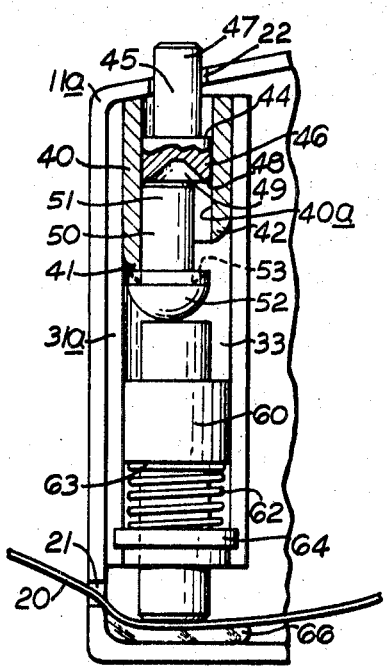
FIG. 3 is a view similar to that of FIG. 2, but showing a brake-engaged condition.

A guide sleeve 40 is fixed coaxially in the guide passage between the aperture 22 and the bars 35, the sleeve having a portion projecting between the bars 35 to define a catch point 41 having a beveled end (as shown in FIGS. 1 to 3). An edge portion of the sleeve diametrally opposite to the catch point defines a release stop 42. The sleeve has an inner surface 40a.

A brake operating element 45 has a cylindrical portion 46 slidably engaged on the sleeve 40 and a coaxial button portion 47 of smaller diameter defining an annular shoulder 44 on the portion 46. The button portion projects through the aperture 22 to the exterior of the housing, the shoulder 44 preventing ejection of the element through the aperture. The cylindrical portion 46 has a conical depression 49 in the end remote from the button portion 47, bounded by a rim 48.

A catch member 50 is provided having a cylindrical stem 51 and a relatively enlarged domed head 52 having a frustoconical groove 53 surrounding the stem. The head is slidably mounted between the guide surfaces 36 of the bars 35 with the stem projecting into and loosely fitted in the sleeve. The guide surfaces 36 constrain the catch member whilst permitting movement of the member perpendicularly to the surfaces 36.

A brake member in the form of a plunger 60 is slidably mounted in the guide passage, defined by the channels 33, and has an end face engaging the dome of the head 52 of the catch member. The plunger is preferably made of nylon to give minimal friction between the head and the plunger. A helical compression spring 62 is mounted about the plunger 60 between an annular shoulder 63 thereon and a shoulder defined by a ring 64 mounted in the annular groove 37 in the body. The spring is always partially compressed and urges the plunger 60 into engagement with the catch member 50. The plunger is slidable between a position almost wholly accommodated in the body 31 and a position projecting from the body beyond the opening 21 so as to engage the tape 20 projecting therethrough.

A resilient friction pad 66 is provided in the housing so that the tape 20 can be held by being clamped between the plunger and the pad.

The tape is withdrawable through the opening, in conventional manner, producing tension in the spiral spring 62, whereby the tape is automatically recoiled by the spring on manual release of the tape. Recoiling can be prevented at any required stage of tape extension by operation of the brake device to clamp the tape in the following manner.

The brake device has two alternative stable conditions, hereinafter referred to as "brake-off" and "brake-on" conditions respectively, each stable condition being achieved from the other stable condition simply by depression and release of the button portion 47 of the brake operating element 45.

In the "brake-off" condition (as shown in FIG. 2), the head 52 of the catch member 50 is urged by the spring, through the plunger 60, into engagement with the release stop 42 on the sleeve 40, the stop projecting into the groove 53 in the head. The catch member is positioned by the stop 42 under the action of the spring so that the stem 51 lies along an inner side of the sleeve axially parallel to the sleeve axis and eccentric thereto. The plunger is urged by the spring into abutment with the center of the dome of the head 52 and projects only slightly beyond the body 31 without engaging the tape 20.

Depression of the button portion 47, against spring pressure, urges a part of the rim 48 of the operating element 45 into abutment with one end of the stem 51 of the catch member, at a position radially spaced from the catch member axis, during initial operative movement of the element. Hence, the catch member is subjected to a couple, provided by a manual force applied at the rim 48 and by spring force applied at the dome center. This couple is initially ineffective, the head being guided for linear movement between the guide surfaces 36 and between the projection of the sleeve defining the catch point 41 and the opposite side of the body guide passage. When the head passes the end of the catch point, however, the catch member is rocked under the action of the couple and the head snaps over to the side of the body guide passage adjacent the catch point 41. On manual release of the button portion 47, the head 52 is urged by the spring into engagement over the catch point 41 and the latter serves to pivot the catch member so as to locate the stem against the side of the sleeve adjoining the catch point, the catch member being axially eccentrically positioned relative to the sleeve axis, but on the diametrally opposite side of the sleeve to the eccentric position in the "brake-off" condition of the device.

Engagement of the head 52 with the catch point 41 defines the "brake-on" condition of the brake device and, in this condition, the plunger projects across the opening 21 in the housing so as to clamp the tape 20 against the pad 66 (as shown in FIG. 3).

Further depression of the button portion 47 causes a part of the rim 48 of the operating element to engage the stem 51 of the catch member at the side of the sleeve adjoining the catch point 41. The head 52 of the catch member is thereby lifted off the catch point 41 and, again due to a couple acting on the catch member, the latter than rocks across the guide passage and the head engages the opposite side of the passage to the catch point. Release of the button portion enables the spring to urge the head back into engagement with the release stop 42 and to the FIG. 2 position. Hence successive reciprocation of the button portion 47 causes engagement of the head alternately with the catch point 41 and the release stop 42 and correspondingly moves the plunger between positions engaging and releasing the tape 20.

The disposition of the button portion facilitates application and release of the brake, both operations requiring only slight finger or thumb pressure on the button portion. The button is readily accessible to the thumb of a hand grasping the housing.

I claim:

1. A tape measure comprising a housing, a flexible tape normally coiled within the housing, a passage defined by the housing structure and having first and second opposing interior walls between which the tape is progressively withdrawable from the housing, a guide path defined within the housing structure and opening at an inner end through the first wall into the passage, a brake member located for movement longitudinally of the guide path between a "brake-on" position at which an end portion of the member protrudes into the passage to clamp a portion of the tape against the second wall and a "brake-off" position at which the tape is unclamped, an operating element located for movement longitudinally of the guide path and having a portion presented at the housing exterior, a catch member located in the guide path between the operating element and the brake member so as to transmit the longitudinal movement of the former to the latter, a catch formation at one side of the guide path determining a holding position at which the catch member abuts and retains the brake member in the "brake-on" position, and means imparting displacement of the catch member laterally of the guide path during longitudinal movement caused by actuation of the operating element for the purpose of urging the brake member towards the "brake-on" position, said lateral movement serving alternately to engage and disengage the catch member from the catch formation by alternate displacement of said member in opposite lateral directions during successive longitudinal movements of the operating member in the same direction.

2. A tape measure according to claim 1 including a brake release stop at an opposite side of the guide path to the catch formation and laterally spaced therefrom determining a second holding position at which the catch member abuts and retains the brake member in the "brake-off" position.

3. A tape measure according to claim 1 wherein the means imparting lateral displacement of the catch member includes a spring resiliently urging the brake member into abutment with the catch member.

4. A tape measure according to claim 3 wherein the catch member is provided with a domed head for abutment with the brake member.

5. A tape measure according to claim 4 wherein a rim of the head is provided for engagement with the catch formation.

6. A tape measure according to claim 3 characterized in that the brake operating element has an end face including a depression surrounded by a rim, said rim providing an abutment for a stem end of the catch member during an initial part of the longitudinal movement caused by actuation of the operating element, and the depression facilitating subsequent lateral displacement of the catch member during said movement.

7. A tape measure according to claim 2 including a sleeve guiding the operating element, the catch formation and the brake release stop being provided at axially spaced positions on the sleeve.

8. A tape measure according to claim 1 having a resilient pad forming the second interior wall of the passage.